2,943,918
PROCESS FOR MANUFACTURING DENSE, EXTRA PURE SILICON

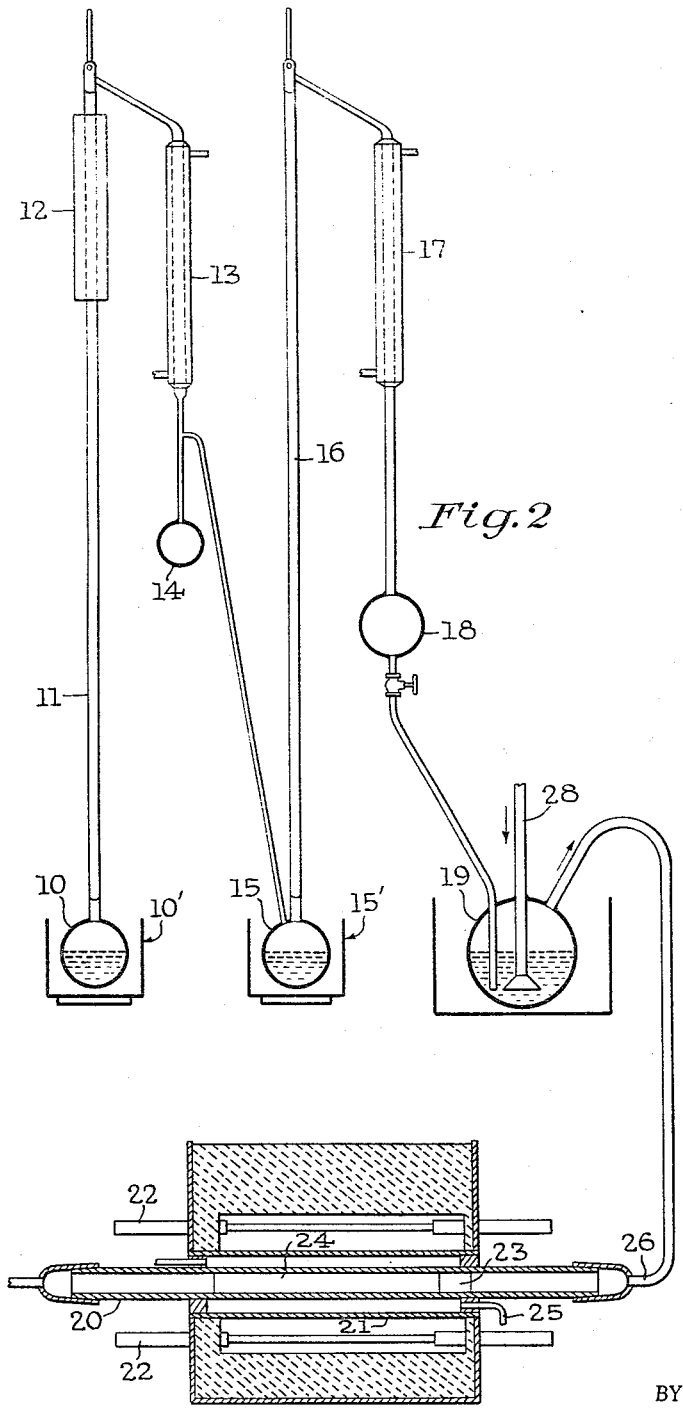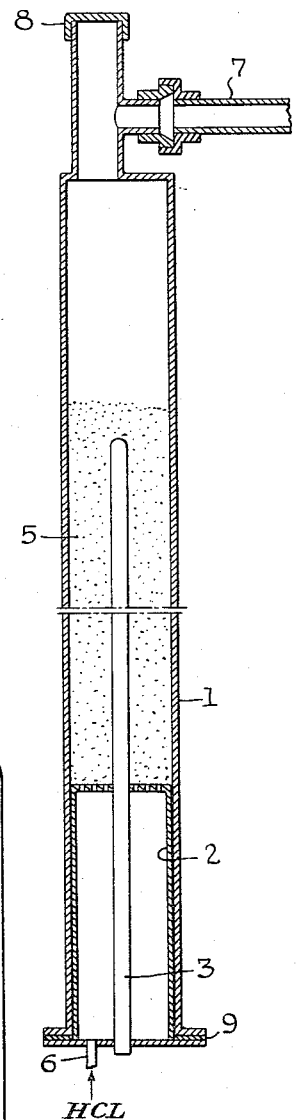

Gerhard Pauls, La Praz, France, assignor to Pechiney, Compagnie de Produits Chimiques et Electrometallurgiques, Paris, France, a corporation of France Filed Feb. 1, 1957, Ser. No. 637,645

Claims priority, application France Feb. 11, 1956

7 Claims. (Cl. 23—223.5)

The present invention, which results from applicant's researches, relates to a process for making extra pure, dense silicon from commercially available technical silicon.

Briefly, according to the present invention, technical silicon—obtained in an electric furnace by known means—is reacted with dry hydrochloric acid gas and converted to trichlorosilane, also known as siliconchloroform, $SiHCl_3$, which is then purified and thereafter decomposed at a temperature between 800° and 1000° C.

More specifically, the invention concerns improvements in carrying out various stages of the process, which improvements make it possible to obtain under good conditions of operation and efficiency, a compact silicon having such a high degree of purity that upon transformation to monocrystals, it can be used for the manufacture of transistors having excellent qualities.

At high temperatures, hydrochloric acid gas reacts with silicon yielding the several products set out below:

$SiH_3Cl$—monochlorosilane
$SiH_2Cl_2$—dichlorosilane
$SiHCl_3$—trichlorosilane (siliconchloroform)
$SiCl_4$—silicontetrachloride also, small quantities of higher chlorides of silicon. The trichlorosilane content is not very high in this mixture of reaction products.

In the presence of a copper catalyst and under certain conditions, it is possible to obtain a condensate containing 80 to 90% trichlorosilane and 10 to 20% silicontetrachloride. The reaction takes place according to the formulae:

(a) $Si + 3HCl = H_2 + SiHCl_3$
(b) $Si + 4HCl = 2H_2 + SiCl_4$

Very good results are obtained with a 5% copper content. A higher content is needless, though not detrimental. The incorporation of copper into technical silicon does not present any difficulty. Gaseous hydrochloric acid attacks this alloy very slowly at about 200° C. The attack is very rapid at about 240° C. and, at this reaction temperature, there is obtained a condensate containing 80 to 90% trichlorosilane.

Above 250° C., it is found that the trichlorosilane content in the condensate decreases greatly. For example, at 300° a condensate is obtained which contains about 50% trichlorosilane and 50% silicontetrachloride. The reaction between the silicon (or the copper-silicon alloy) and the gaseous hydrochloric acid is highly exothermic. In order that the temperature remain uniform during the reaction and not rise above 250° C., the hydrochloric acid should be introduced very slowly, which limits production. The rate of introduction of hydrochloric acid gas may be increased by diluting the acid with a gas which does not take part in the reaction, for example, hydrogen or nitrogen. The walls of the reaction furnace should quickly remove the heat evolved during the reaction; however, too intense a cooling should be avoided in order that the reaction not be stopped in the vicinity of the walls.

To achieve this result, it is desirable to use small diameter tubular furnaces, which have a large cooling surface for a given charge of silicon containing 5% copper. However, it is necessary to facilitate the circulation of the gaseous products and, therefore to use, for example, lumps of alloy 5 to 10 millimeters in size which prevents too large a reduction in the diameter of the tubular furnaces.

Other features of the present invention and advantages thereof will appear more fully upon consideration of the following description of the invention, as shown by the accompanying diagrammatic drawings, wherein Fig. 1 illustrates in vertical section an example of an embodiment of a furnace for producing trichlorosilane under efficient conditions;

Fig. 2 is a vertical view, partly in section, of a device for purifying the trichlorosilane, also, of a furnace wherein the trichlorosilane is dissociated and the resultant dense silicon is deposited.

Referring to Fig. 1 of the drawings:

1 is a steel tube; 2 a grid supporting the charge of silicon-copper alloy 5; 3 is a tube closed at one end, permitting insertion of a thermocouple into the charge for supervising the temperature inside the furnace during the reaction. Dry hydrochloric acid gas, diluted with hydrogen, enters at 6. The crude trichlorosilane leaves the furnace through tube 7 and passes to the condenser; 8 is a plug permitting filling of tube 1; 9 is a joint enabling discharge of the furnace when the reaction is terminated.

The filling and discharging of such a furnace is an easy matter. Once charged, the furnace 1 can run for 10 days or so without interruption. It is possible to connect several furnaces to a single condenser. In order that the temperature of the charge remain uniform without varying more than about 20° C., the walls of the furnace 1 are heated by any suitable means (not shown) as by resistors grouped around the furnace, or by an oil bath with rapid oil circulation or, better still, by means of rapidly circulating warm air.

The operation is as follows:

The furnace 1 having been filled with a charge of silicon-copper alloy, the air is expelled by means of nitrogen. The charge is heated in a nitrogen stream to 240° C. by controlling the temperature inside and outside the furnace by any suitable means (not shown). When the above temperature has been reached, it is determined whether the furnace as well as its charge has been well dried. Following complete drying, the nitrogen is expelled by means of hydrogen and a steady current of hydrochloric acid gas is passed through the charge. The furnace 1 is placed in a steady state (equilibrium) by reducing the heating and controlling the temperature. Poor results are obtained when the furnace is not completely dried, and there is a risk of the furnace and its ducts becoming plugged as a result of the hydrolysis of the reaction products.

Once equilibrium conditions have been obtained, the furnace is able to work a long time without further control.

The trichlorosilane content in the condensate is controlled by measuring the latter's specific weight, which increases when the trichlorosilane content tends to decrease; when this happens, nitrogen or hydrogen is added to the hydrochloric acid. The same result can also be obtained by lowering the speed of the hydrochloric acid stream. However, this leads to a reduction in the quantity of the condensate. Before discharging the furnace, it is filled with nitrogen. The residues from the reaction contain unreacted silicon-copper and powdered copper;

these are separated by screening The silicon-copper is thereafter washed with water, dried and recycled.

To condense the crude SiHCl₃, it is preferable to cool the condenser down to a temperature of about −80° C. At this temperature, over 90% of the resultant products can be condensed. (About 10% escape with the hydrogen evolved during the reaction.) At 0° C., about 50% of the reaction products are not condensed. It is also possible to condense the crude SiHCl₃ under high pressure, thereby obtaining effective condensation at not quite such a low temperature.

The following example—not given by way of limitation—will illustrate a practical operation: Using a tubular furnace 100 mm. in diameter, about 8 kgms. of silicon-copper containing 5% copper is introduced into the furnace. Equilibrium temperature is attained by passing 100 liters per hour of dry diluted hydrochloric acid diluted with about an equal quantity of hydrogen. The temperature around and outside the tube is maintained at about 220° C. with an internal temperature of 240° C. Under these conditions, the tubular furnace produces about 4 kgms. crude trichlorosilane in 24 hours.

The density of this crude trichlorosilane is 1.366, whereas that of pure SiHCl₃ is only 1.35. The largest impurity is SiCl₄, but the crude product contains small quantities of very harmful impurities, for example, boron, which it is advisable to eliminate. Surprisingly, applicant has discovered that by subjecting the crude product to double distillation under reflux conditions, it is possible to obtain a trichlorosilane of suitable purity.

A suitable distillation system for this purpose is illustrated in Figure 2 of the drawings. Although Pyrex glass contains large quantities of boron, it has been possible to produce SiHCl₃, in contact with such glass, devoid of boron. Accordingly, the distillation apparatus is made entirely of Pyrex glass. In assembling the apparatus, there are used ground joints of the same material; some joints are made with Teflon.

The first distillation unit 10, 11, 12, 14 comprises the still 10, heated in any suitable manner as by a heating device 10′, a column 11, a reflux condenser 12 which provides the necessary reflux for the vapors from the still 10, a condenser 13 for the vapors issuing from the top of column 11, and a receiver 14 for the condensed vapors.

The second distillation unit 15, 16, 17, 18 comprises a still 15 heated in any suitable manner as by a heating means 15′, a column 16, a condenser 17 and a receiver 18 for the condensate.

Upon treating the crude trichlorosilane product in the first distillation unit, the trichlorosilane is separated from the silicon tetrachloride and most of the other impurities are also removed. The partially purified product obtained in receiver 14 is then passed through the second distillation unit, and the pure trichlorosilane product is obtained at 18. When the double distillation is carried out properly, there is obtained a product having the desired purity. The first portion of the distillate, 10 to 15%, containing small traces of impurities, can either be discharged from 14 or, else, can be subjected to further distillation.

The whole installation is built up in such a way that the trichlorosilane, once introduced into the apparatus, is not touched again before its conversion to silicon in the manner detailed below. In this connection, it should be noted that, in the presence of traces of moisture, SiCHl₃ yields a hard, highly adherent deposit which makes it difficult to dismantle the apparatus without breaking the same. Hence, unnecessary handling of the SiCHl₃ should be avoided.

About 800° C., trichlorosilane is decomposed into silicon and silicontetrachloride, according to the equation:

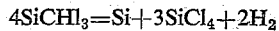

$$4SiCHl_3 = Si + 3SiCl_4 + 2H_2$$

When vapors of trichlorosilane are introduced into a quartz tube at temperatures ranging between 800° C. and 1000° C., there is obtained a brown powder or very finely divided silicon. To obtain a dense deposit, it is necessary to dilute the SiHCl₃ with an inert gas, for example, with argon, nitrogen or hydrogen. In the following portion of the description, hydrogen alone will be referred to but without limitation thereto:

At 950° C. and with a mixture of about 5 volumes of hydrogen and 1 volume of trichlorosilane vapor, a very dense silicon deposit is obtained. The hydrogen must be extremely pure and absolutely dry. After overcoming numerous difficulties, applicant has originated a satisfactory method for purifying and drying hydrogen, briefly as follows: The hydrogen is passed through a tube packed with palladized asbestos heated to 300–320° C., for the purpose of removing oxygen which is contained in minute quantities in the hydrogen. Another tube packed with caustic soda absorbs the carbon dioxide contained in the hydrogen and, at the same time, partially dries the hydrogen. Magnesium perchlorate is used for the final drying. The hydrogen, dried in this manner, must be passed through a filter of absorbent cotton or other filtering material to prevent contamination of the produced silicon with traces of magnesium; the last traces of moisture are removed by contact with trichlorosilane.

During the first hours of the decomposition, it is preferable to use a mixture of hydrogen and trichlorosilane containing less than 20% trichlorosilane vapors. In this way, there is prevented the formation of powdered silicon, which would be carried off in large part by the stream of decomposition gas. As soon as a solid layer of small silicon crystals has been formed on the tube wall, the content of trichlorosilane vapors can be increased to 20%. The reaction is favored by the presence of the already formed silicon, and the speed of flow of the hydrogen-trichlorosilane mixture can likewise be increased.

To obtain the hydrogen-trichlorosilane mixture, hydrogen is bubbled, for example, by a tube 28 through a vessel 19 containing trichlorosilane, from the receiver 18, and which is maintained at a suitable temperature, for example at −5° C.; the hydrogen which leaves this bubbling vessel is charged with about 20% trichlorosilane vapor.

To obtain from this gaseous mixture a very pure, dense silicon, fractional decomposition is resorted to by passing this mixture, for example, through a quartz tube—the temperature of which ranges between 800 and 900° C., according to the speed of flow. A portion of the trichlorosilane is decomposed in the tube and retains the last traces of impurities.

The mixture is then passed through a second quartz tube, heated to 950° C., and there, the trichlorosilane is decomposed into SiCl₄ and dense silicon. The silicon tetrachloride, still containing a little trichlorosilane, is condensed at the outlet of the quartz tube. The trichlorosilane is recovered by fractional distillation and is recycled. It is also possible to eliminate the preliminary decomposition tube by heating the inlet of the decomposition tube to a temperature below 950° C. A portion of impure silicon will then be found in this zone, whereas the remainder of the decomposition zone, heated to 950° C., will contain silicon of high purity.

By way of a non-limiting example: Using a quartz tube 20 having an internal diameter of 50 mm., the first portion 23 thereof, 100 mm. long, is heated to 850° C., while the second portion 24, 400 mm. long, is heated to 950° C. by means of resistors 22, and a hydrogen stream is introduced at 26 at the rate of 100 liters per hour, bubbling it first through the vessel 19, which contains trichlorosilane and is initially maintained at −9° C. As soon as the formation of silicon crystals on the tube walls is observed, the speed of the hydrogen through the tube is successively increased to 200–300 liters per hour. At the same time, the temperature of the bubbling vessel 19 is progressively raised to −5° C. After a run of 80 to 100 hours, the dense silicon deposit fills almost completely the portion of the tube heated to 950° C. The decomposition operation is then finished. A pure hydrogen stream is passed through the tube which is allowed to cool. The silicon deposit is highly adherent, causing the quartz tube to break on cooling by reason of the great difference in expansion between the two materials.

In order to prevent the silicon from coming in contact with air when the tube breaks, the quartz tube 20 is sealed in a second quartz tube 21 of larger diameter. A current of an inert gas, for example, argon or purified hydrogen, is passed through 25 into the space between these two tubes at the time of cooling. The dense silicon is recovered in an amount of about 1000-1200 g.; the surface layer thereof, in contact with the quartz, still contains some impurities. It is freed from quartz by hot washing with hydrofluoric acid and rinsing with distilled water. It is then washed with a pure, caustic soda solution which attacks the silicon at the surface; it is rinsed and again washed with hydrofluoric acid. Washing with distilled water completes the operation. Thereafter, the silicon is dried.

The decomposition of the trichlorosilane gives a yield slightly above theoretical. Indeed, 1 part silicon should be obtained from 4 parts of trichlorosilane; actually, there is sometimes obtained a silicon deposit which corresponds to about 27 to 28% of the silicon contained in the trichlorosilane. It seems that a certain quantity of silicon is produced according to the reversible reaction:

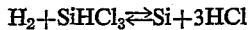

$$H_2 + SiHCl_3 \rightleftarrows Si + 3HCl$$

Indeed, it is found that the gases leaving the decomposition tube contain hydrochloric acid.

The silicon thus obtained is spectrographically pure. Following conversion of this silicon into monocrystals (single crystals), its resistivity exceeds 50 ohms. It constitutes, therefore, a choice material for the manufacture of transistors.

On technological grounds the above described operations were carried out under atmospheric pressure, however they may also be effected under pressures other than one atmosphere.

On the other hand, for economical reasons, the process has been experienced with HCl as starting material, but it may also be carried out with other hydrohalogenic acids, that is HF, HBr or HI, or with mixtures of such acids.

I claim:
1. Process for producing dense, spectrographically pure silicon, comprising the steps of: contacting in a reaction zone silicon containing about 5% copper with gaseous hydrochloric acid at a temperature not in excess of 250° C. to thereby form a mixture of vapors containing trichlorosilane; subjecting said mixture to successive distillations under reflux conditions to produce trichlorosilane of high purity; heating said highly purified trichlorosilane diluted with hydrogen in a plurality of decomposition zones maintained at progressively higher temperatures, whereby the initial decomposition zone is heated to a temperature within the range of 800°-900° C., and the final decomposition zone to about 950° C., to decompose the trichlorosilane and produce a deposit of silicon in solid state, and recovering the deposited silicon.

2. Process according to claim 1, wherein the trichlorosilane is distilled in apparatus formed of boron-containing glass.

3. Process according to claim 1, wherein the temperature inside the first reaction zone is maintained at about 240° C., and the temperature outside the reaction zone and contiguous thereto is maintained at about 220° C.

4. Process according to claim 1, wherein the recovered silicon is successively treated with hydrofluoric acid and caustic soda, whereby it is freed of its contaminated surface layer.

5. Process according to claim 1, wherein hydrogen is heated to 300°-320° C. in the presence of palladized asbestos to remove any oxygen admixed therewith; the purified hydrogen is successively passed through caustic soda and magnesium perchlorate to dry the same, and the dried purified hydrogen is mixed with the trichlorosilane to be decomposed.

6. Process according to claim 1, characterized in that it is carried out at atmospheric pressure.

7. Process for producing dense, crystalline spectrographically pure silicon, comprising the steps of: contacting in a reaction zone silicon containing about 5% copper with gaseous hydrochloric acid at a temperature not in excess of 250° C. to thereby form a mixture of vapors containing trichlorosilane; subjecting said mixture to successive distillations under reflux conditions to produce trichlorosilane of high purity; diluting said purified mixture with hydrogen whereby said mixture initially contains a content of trichlorosilane less than 20%; heating said mixture in a plurality of decomposition zones maintained at progressively higher temperatures, whereby the initial decomposition zone is heated to a temperature within the range of 800°-900° C., and the final decomposition zone to about 950° C., to decompose the trichlorosilane and produce a deposit of dense crystalline silicon in solid state on the walls of the decomposition zone; thereafter increasing the trichlorosilane content in the mixture, and recovering the deposited crystalline silicon.

References Cited in the file of this patent
UNITED STATES PATENTS

| | | |
|---|---|---|
| 2,406,605 | Hurd | Aug. 27, 1946 |
| 2,458,703 | Hatcher | Jan. 11, 1949 |
| 2,547,874 | Klema | Apr. 3, 1951 |
| 2,766,112 | Schafer | Oct. 9, 1956 |

FOREIGN PATENTS

| | | |
|---|---|---|
| 745,698 | Great Britain | Feb. 29, 1956 |

OTHER REFERENCES

FIAT final report, 789, "Experiments to Produce Ductile Silicon," Field Information Agency Technical, Apr. 3, 1946.

Lyon et al.: "Preparation of Hyper-Pure Silicon," Journal of Electrochemical Society, vol. 96, No. 6, December 1949, pp. 359-363.

Litten et al.: "High Purity Silicon," Journal of Electrochemical Society, vol. 101, No. 6, June 1954, pp. 287-292.

Mellor: "Comprehensive Treatise on Inorganic and Theoretical Chemistry," vol. 6, 1925, pp. 282, 968.

UNITED STATES PATENT OFFICE
CERTIFICATE OF CORRECTION

Patent No. 2,943,918

July 5, 1960

Gerhard Pauls

It is hereby certified that error appears in the printed specification of the above numbered patent requiring correction and that the said Letters Patent should read as corrected below.

Column 3, line 58, for "discharded" read -- discarded --; lines 64 and 67, for "SiCHl$_3$", each occurrence, read -- SiHCl$_3$ --; line 69, for "About" read -- Above --; same column 3, line 71, the equation should appear as shown below instead of as in the patent:

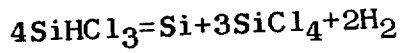

$$4SiHCl_3 = Si + 3SiCl_4 + 2H_2$$

Signed and sealed this 13th day of December 1960.

(SEAL)
Attest:

KARL H. AXLINE
Attesting Officer

ROBERT C. WATSON
Commissioner of Patents